(12) United States Patent
Zhang

(10) Patent No.: US 10,633,010 B1
(45) Date of Patent: Apr. 28, 2020

(54) TRAILER WITH NO EXTRA HEIGHT WHEN FOLDING

(71) Applicant: Xiangshan Zhang, Zhejiang (CN)

(72) Inventor: Xiangshan Zhang, Zhejiang (CN)

( * ) Notice: Subject to any disclaimer, the term of this patent is extended or adjusted under 35 U.S.C. 154(b) by 0 days.

(21) Appl. No.: 16/172,699

(22) Filed: Oct. 26, 2018

(30) Foreign Application Priority Data

Sep. 1, 2018 (CN) .......................... 2018 1 1017282

(51) Int. Cl.
  *B62B 3/02* (2006.01)
  *B62B 5/06* (2006.01)

(52) U.S. Cl.
  CPC .............. *B62B 3/022* (2013.01); *B62B 5/067* (2013.01); *B62B 2205/06* (2013.01)

(58) Field of Classification Search
  CPC ....... B62B 5/06; B62B 3/04; B62B 2202/404; B62B 3/022; B62B 3/07
  See application file for complete search history.

(56) References Cited

U.S. PATENT DOCUMENTS

| | | | | |
|---|---|---|---|---|
| 1,998,269 A * | 4/1935 | Brown | ................... | A61G 21/00 27/27 |
| 4,878,682 A * | 11/1989 | Lee | ........................ | B62B 3/025 280/42 |
| 9,738,298 B1 * | 8/2017 | Yang | ....................... | B62B 3/025 |
| 10,004,470 B2 * | 6/2018 | Muller | ................. | A61B 6/0414 |
| 2014/0001735 A1 * | 1/2014 | Yang | ........................ | B62B 3/02 280/651 |
| 2015/0151711 A1 * | 6/2015 | Fujiwara | ............... | B60R 21/207 280/728.2 |
| 2018/0057035 A1 * | 3/2018 | Choi | ........................ | B62B 7/06 |
| 2018/0327011 A1 * | 11/2018 | Horowitz | ................. | B62B 3/02 |

* cited by examiner

*Primary Examiner* — James A Shriver, II
*Assistant Examiner* — James J Triggs

(57) ABSTRACT

The invention provides a trailer with no extra height when folding, comprising fixed standpipes arranged at a front and rear end of the trailer, and front and rear folding components, side folding components, bottom folding components and handle components connected to the fixed standpipes. The height of the trailer in the invention does not change after folding to ensure that the height after folding and the height in use are the same, thereby the object that the volume after folding is smaller than that of the prior trailer. By proving telescopic components on the handle components, the trailer can be telescopically folded by handle components when not in use, which reduces space occupation and is practical and convenient; simultaneously, by providing reset torsion spring on the handle components, the object of automatically resetting of the handle when the trailer not in use can be achieved.

10 Claims, 14 Drawing Sheets

_US 10,633,010 B1_

TRAILER WITH NO EXTRA HEIGHT WHEN FOLDING

1. FIELD OF THE INVENTION

The invention relates to the technical field of trailers, in particular to a trailer with no extra height when folding.

2. BACKGROUND ART

In daily life and production, it is often necessary to carry luggage or articles, and trailers are often used during handling. Trailers are widely used for carrying things because of its features of convenient driving, time-saving and labor-saving, many of the prior trailers are composed of a flat plate and are provided with wheels under the flat plate for carrying, this kind of trailers can't be folded and take up a lot when not in use.

There are now some prior trailers that can be folded, but have the following disadvantages:

(1) The trailers have a small capacity, and the heights and volume are increased after folding;

(2) The handle of the trailers can not be automatically reset and is inconvenient to use.

SUMMARY OF THE INVENTION

The invention aims to solve the defects of the prior art by providing a trailer with no extra height when folding, and to achieve the purpose of that trailers have a small volume when folding and large capacity when unfolding.

In order to achieve the above object, the invention adopts a technical scheme:

A trailer with no extra height when folding, comprising fixed standpipes arranged at a front and rear end of the trailer, and front and rear folding components, side folding components, bottom folding components and handle components connected to the fixed standpipes;

wherein a top-corner fixed piece is fixed on the fixed standpipes, and slidably connected with a first linkage sliding sleeve; the front and rear folding components comprise at least two hinged front and rear X components, the front and rear X components are formed by two cross pipes which are crosswise hinged together by an articulated shaft, the ends of the cross pipes are hinged with the top-corner fixed piece or the first linkage sliding sleeve;

wherein the side folding components comprise two side folding shelves and a folding driving pipe, the side folding shelf comprises a side cross short pipe, a side cross long pipe and a horizontal connecting pipe, the side cross short pipe and the side cross long pipe are crosswise hinged by articulated shaft; one end of the folding driving pipes is hinged with two said horizontal connecting pipes, and the other end thereof is hinged with ends of two said side cross long pipes; the other end of the side cross long pipe is hinged with the top-corner fixed piece, one end of the side cross short pipe is hinged with the first linkage sliding sleeve and the other end thereof is hinged with one end of the horizontal connecting pipe; the bottom folding components comprise two bottom X components, the bottom X components are formed by one end of four bottom connecting pipes being simultaneously hinged with one same bottom connecting piece; the other end of the bottom connecting pipe is hinged with a second linkage sliding sleeve slidably connected with the folding driving pipe or a bottom-corner fixed piece fixedly connected to the fixed standpipes.

Preferably, two fixed standpipes are respectively arranged at front and rear ends of the trailer, the top-corner fixed piece is arranged at an upper end of any of the fixed standpipes, and the bottom-corner fixed piece is arranged near a lower end of any of the fixed standpipes; the first linkage sliding sleeve is arranged between the top-corner fixed piece and the bottom-corner fixed piece.

Preferably, two fixed standpipes arranged at front end of the trailer and two fixed standpipes arranged at rear end of the trailer are respectively arranged with front and rear folding components; two fixed standpipes arranged at left side of the trailer and two fixed standpipes arranged at right side of the trailer are respectively arranged with side folding components, and the bottom folding components are arranged near the lower end of the fixed standpipes.

Preferably, one end of the horizontal connecting pipe is provided with a joint I, one end of the side cross long pipe is provided with a joint II, one end of the folding driving pipe is hinged to two said joint I by articulated shaft, and the other end thereof is hinged to two said joint II by articulated shaft.

Preferably, one end of the cross pipes of two adjacent said front and rear folding components are hinged by articulated shaft.

Preferably, any of the fixed standpipes is provided with an idler wheel on the lower end, the idler wheel is arranged on the lower end of the fixed standpipes by a wheel fork.

Preferably, the handle components comprise a handle, an upper pull rod and a lower pull rod, the upper end of the upper pull rod is connected to the handle and the lower end is connected to the lower pull rod, the lower end of the lower pull rod is connected to a pull rod connecting piece; a pull rod connecting pipe is respectively hinged on both sides of the pull rod connecting piece by articulated shaft, and the other end of the pull rod connecting pipe is hinged to a pull rod steering piece by articulated shaft, the pull rod steering piece is arranged on a fixed U-shape piece, the fixed U-shape piece is arranged near the lower end of the fixed standpipes.

Preferably, the handle components comprise telescopic components, the telescopic components comprise a locking clamp, a compressed spring, an inner pipe fixed piece and an unlock button; the unlocking button is fixed on the upper end of the lower pull pod, the inner pipe fixed piece is arranged on the lower end of the upper pull rod and can slide up and down in the upper pull pod; the locking clamp is arranged in the inner pipe fixed piece, and the compressed spring is arranged in the locking clamp; the lower pull rod is provided with a locking hole, and a protrusion on the locking clamp is locked on the locking hole of the lower pull rod to realize locking of the upper pull rod.

Preferably, a reset torsion spring is arranged in the pull rod steering piece, the reset torsion spring and the pull rod steering piece are connected to the fixed U-shape piece by a rotation point, one end of the reset torsion spring is connected to the fixed U-shape piece and the other end thereof is fixed on the pull rod steering piece.

Preferably, the side height and the front and rear height of the trailer are unchanged after folding.

In summary, compared with the prior art, the invention has the following advantages due to the adoption of the technical scheme:

The trailer of the invention folds by providing front and rear folding components, side folding components and bottom folding components, and the height of the trailer does not change after folding to ensure that the height after folding and the height in use are the same, thereby the object that the volume after folding is smaller than that of the prior trailer. By providing telescopic components on the handle components, the trailer can be telescopically folded by handle components when not in use, which reduces space occupation and is practical and convenient; simultaneously, by providing reset torsion spring on the handle components, the object of automatically resetting of the handle when the trailer not in use can be achieved.

Figure 1:
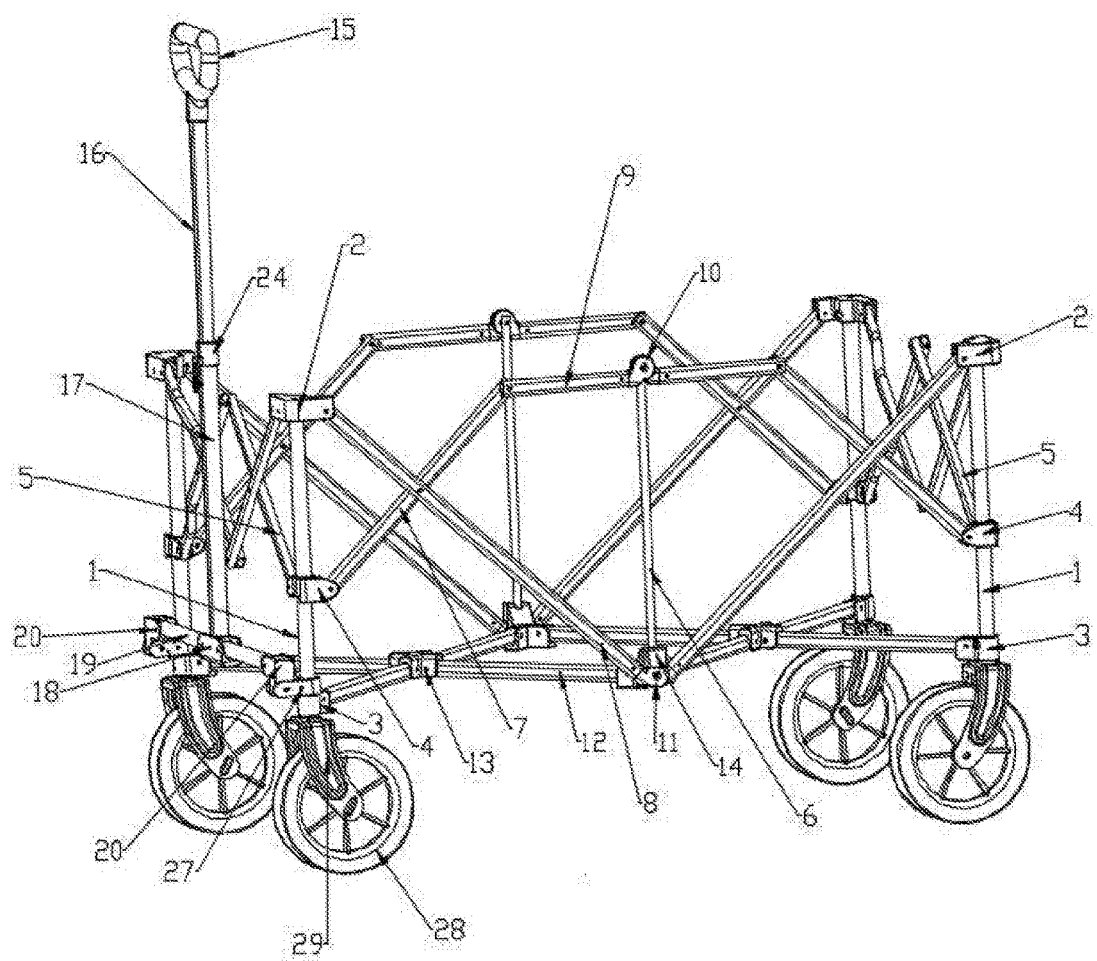
FIG. 1 is a schematic diagram showing the structure of the invention.

Reference numbers given in the drawings are as follows: 1 refers to fixed standpipes, 2 refers to the top-corner fixed piece, 3 refers to the bottom-corner fixed piece, 4 refers to the first linkage sliding sleeve, 5 refers to cross pipes, 6 refers to folding driving pipes, 7 refers to side cross short pipes, 8 refers to side cross long pipes, 9 refers to horizontal connecting pipes, 10 refers to joint I, 11 refers to joint II, 12 refers to bottom connecting pipes, 13 refers to the bottom connecting piece, 14 refers to the second linkage sliding sleeve, 15 refers to the handle, 16 refers to the upper pull rod, 17 refers to the lower pull rod, 18 refers to the pull rod connecting piece, 19 refers to pull rod connecting pipes, 20 refers to pull rod steering pieces, 21 refers to the locking clamp, 22 refers to the compressed spring, 23 refers to the inner pipe fixed piece, 24 refers to the unlock button, 26 refers to the reset torsion spring, 27 refers to the fixed U-shape piece, 28 refers to idler wheels, 29 refers to wheel forks.

DESCRIPTION OF THE SPECIFIC EMBODIMENTS

The specific embodiments of the invention will be further described in detail below with reference to the accompanying drawings.

As shown in FIG. 1-6, the invention provides a trailer with no extra height when folding, comprising fixed standpipes arranged at a front and rear end of the trailer, and front and rear folding components, side folding components, bottom folding components and handle components connected to the fixed standpipes;

Specifically, two fixed standpipes 1 are respectively arranged at front and rear ends of the trailer, any of the fixed standpipes 1 is provided with an idler wheel 28 on the lower end, the idler wheel 28 is arranged on the lower end of the fixed standpipes 1 by a wheel fork 29.

The top-corner fixed piece 2 is arranged at an upper end of any of the fixed standpipes 1, and the bottom-corner fixed piece 3 is arranged near a lower end of any of the fixed standpipes 1. Any of the fixed standpipes 1 is also slidably connected with a first linkage sliding sleeve 4, the first linkage sliding sleeve 4 is arranged between the top-corner fixed piece 2 and the bottom-corner fixed piece 3.

Two fixed standpipes 1 arranged at front end of the trailer and two fixed standpipes 1 arranged at rear end of the trailer are respectively arranged with front and rear folding components, two fixed standpipes 1 arranged at left side of the trailer and two fixed standpipes 1 arranged at right side of the trailer are respectively arranged with side folding components, and the bottom folding components are arranged near the lower end of the fixed standpipes 1.

The front and rear folding components comprise at least two hinged front and rear X components, the front and rear X components are formed by two cross pipes 5 which are crosswise hinged together by an articulated shaft, one end of the cross pipes 5 of two adjacent said front and rear folding components are hinged by articulated shaft. The ends of the cross pipes 5 of the hinged front and rear X components are hinged with the top-corner fixed piece 2 or the first linkage sliding sleeve 4.

The side folding components comprise two side folding shelves and a folding driving pipe 6, the side folding shelf comprises a side cross short pipe 7, a side cross long pipe 8 and a horizontal connecting pipe 9, the side cross short pipe 7 and the side cross long pipe 8 are crosswise hinged by articulated shaft.

One end of the folding driving pipe 6 is hinged with one end of the horizontal connecting pipes 9 of two side folding shelves, and the other end thereof is hinged with one end of the side cross long pipe 8. Specifically, one end of the horizontal connecting pipe 9 is provided with a joint I 10, one end of the side cross long pipe 8 is provided with a joint II 11, one end of the folding driving pipe 6 is hinged to two joint I 10 by articulated shaft, and the other end thereof is hinged to two joint II 11 by articulated shaft.

The other end of the side cross long pipe 8 is hinged with the top-corner fixed piece 2 by articulated shaft, one end of the side cross short pipe 7 is hinged with the first linkage sliding sleeve 4 by articulated shaft and the other end thereof is hinged with one end of the horizontal connecting pipe 9.

The bottom folding components comprise two bottom X components, the bottom X components are formed by one end of four bottom connecting pipes 12 being simultaneously hinged with the same bottom connecting piece 13. The folding driving pipe 6 is slidably connected with a second linkage sliding sleeve 14, the other end of the bottom connecting pipe 13 is hinged with the second linkage sliding sleeve 14 or the bottom-corner fixed piece 3 by articulated shaft.

Figure 2:
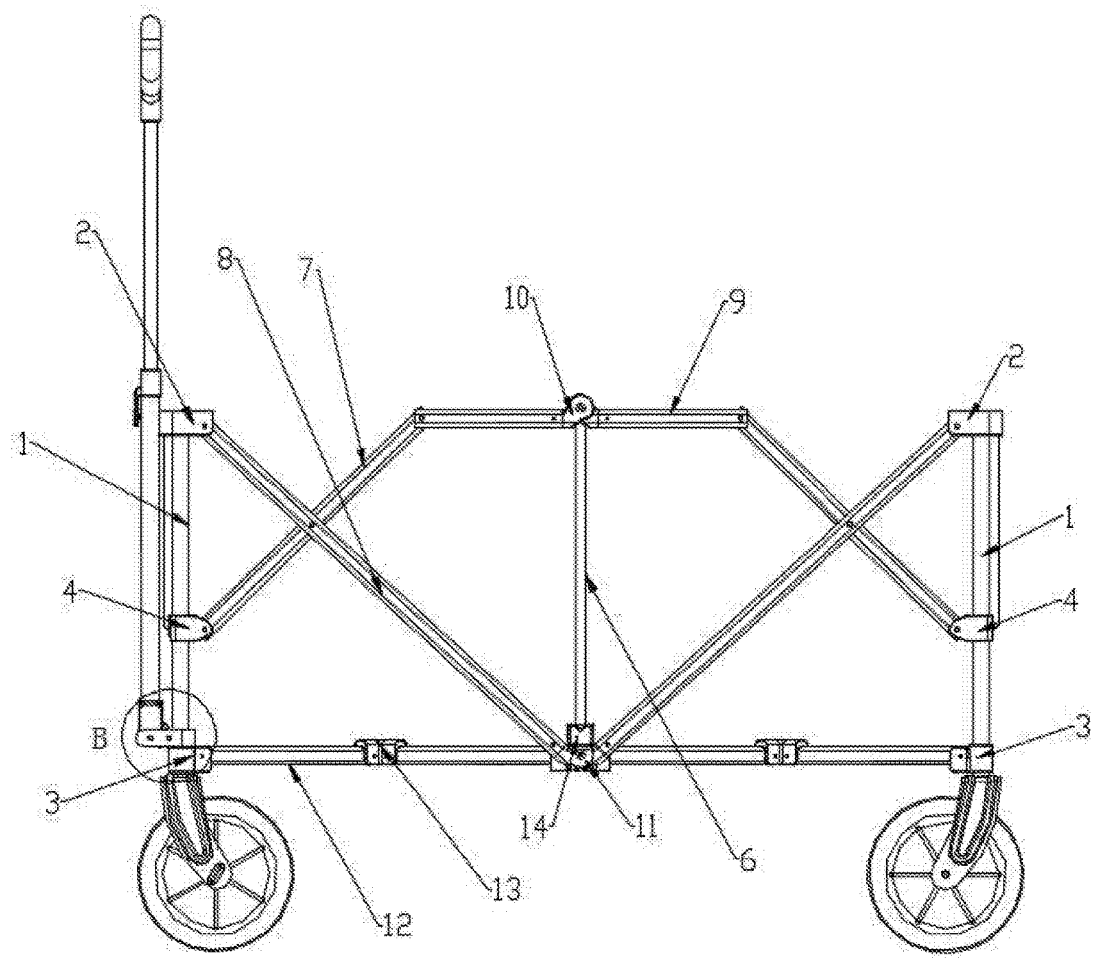
FIG. 2 is a schematic diagram showing the side structure of the invention.
Figure 3:
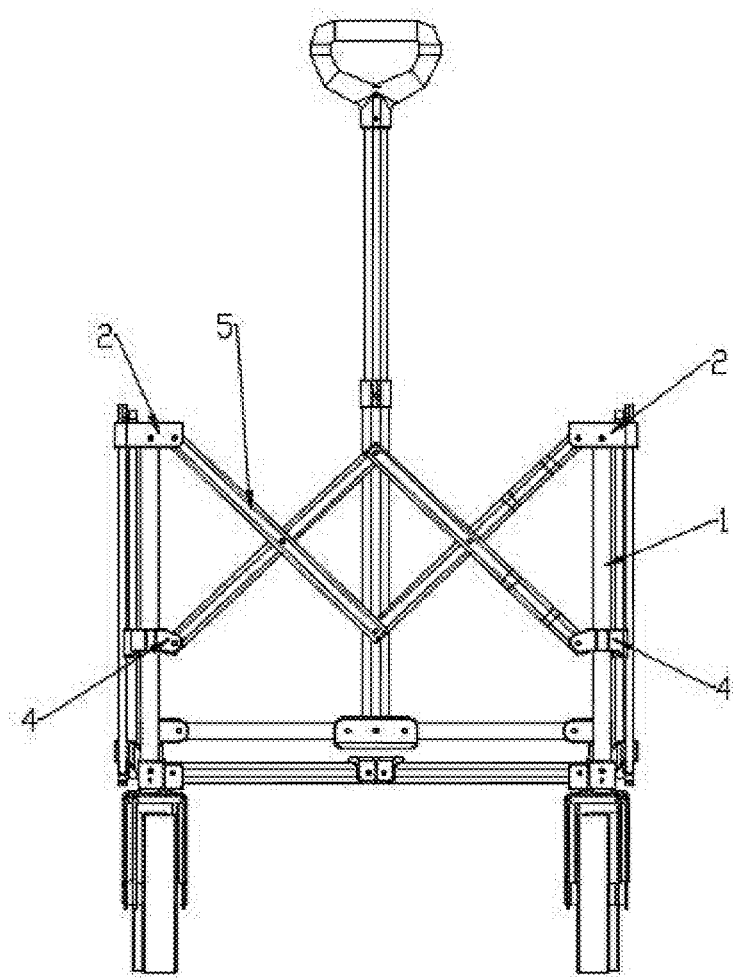
FIG. 3 is a schematic diagram showing the rear structure of the invention.
Figure 7:
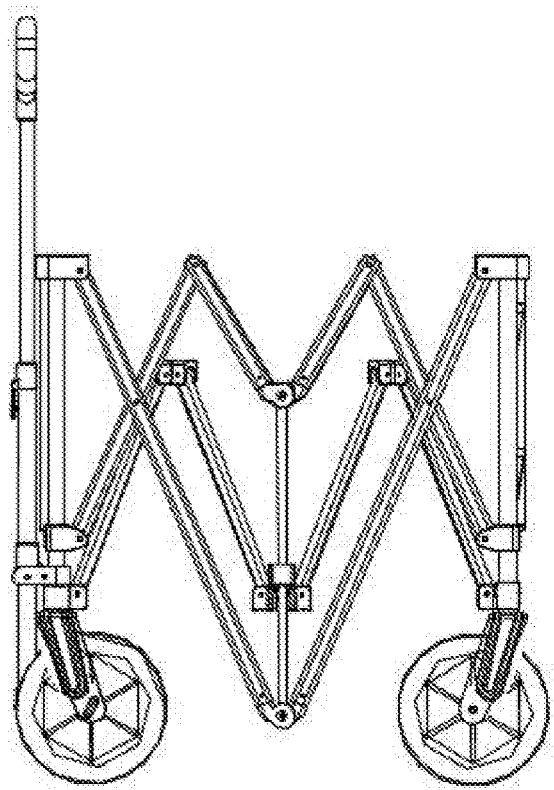
FIG. 7 is a schematic diagram showing the half-folded state of the side of the invention.
Figure 8:
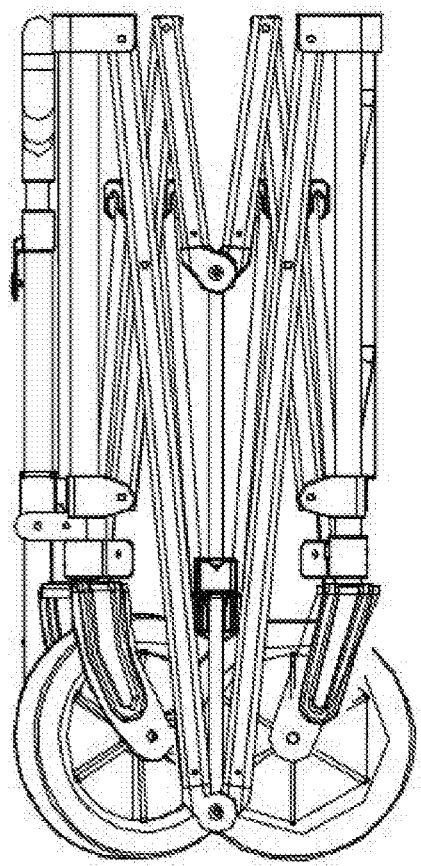
FIG. 8 is a schematic diagram showing the fully-folded state of the side of the invention.

The height of the trailer in the invention does not change after folding as shown in FIG. 2, which is a schematic diagram showing the side structure of the invention. As shown in FIG. 7 and FIG. 8, after lifting up the bottom connecting pieces 13 at the same time, the bottom connecting pipes 12 are intend to be close to each other around the rotation point of the bottom connecting pieces 13, and the bottom-corner fixed piece 3 is close to the center, thereby, the trailer of the invention changes from an unfolded state to a folded state. Simultaneously, the fixed standpipes 1 at the front and rear ends are close to the center, one end of the side cross short pipe 7 is folded downward around the rotation point of the first linkage sliding sleeve 4 and the other end thereof is rotated around the same rotation point of the horizontal connecting pipes 9; one end of the side cross long pipe 8 is folded downward around the rotation point of the top-corner fixed piece 2 and the other end thereof is folded downward around the same rotation point.

The second linkage sliding sleeve 14 slides upward on the folding driving pipe 6, and the joint I and the joint II are folded downward at the same time, and the fixed standpipes 1, the side cross short pipe 7, the side cross long pipe 8 and the horizontal connecting pipes 9 are all moved towards the center. FIG. 7 shows the half-folded state of the invention and FIG. 8 shows the fully-folded state of the invention, the side height of the invention does not change after folding.

Figure 4:
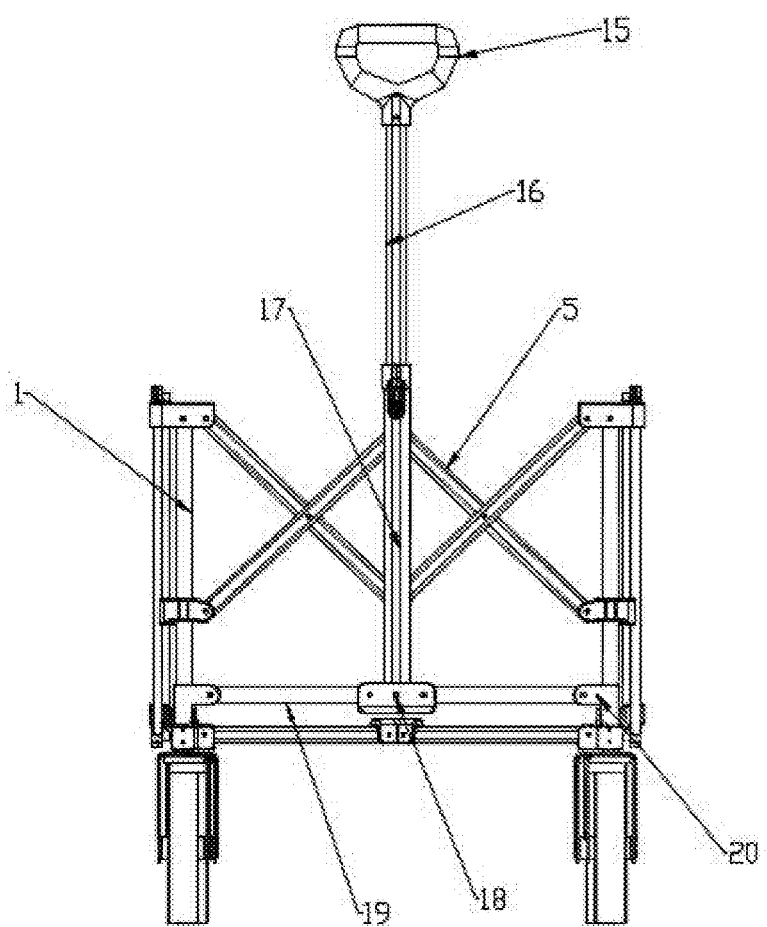
FIG. 4 is a schematic diagram showing the front structure of the invention.
Figure 5:
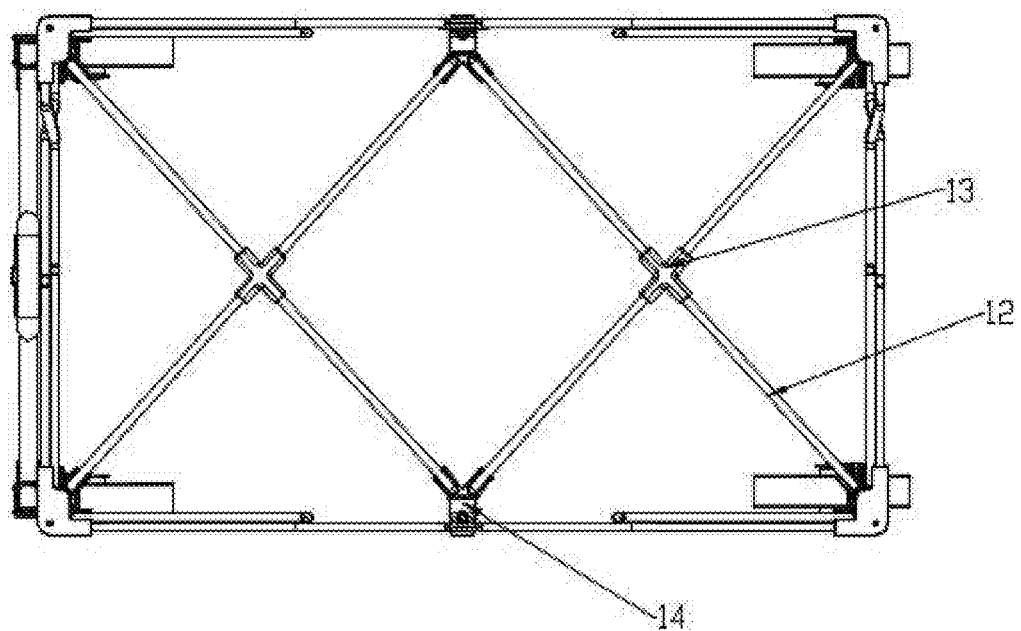
FIG. 5 is a schematic diagram showing the structure of the bottom folding components of the invention.
Figure 9:
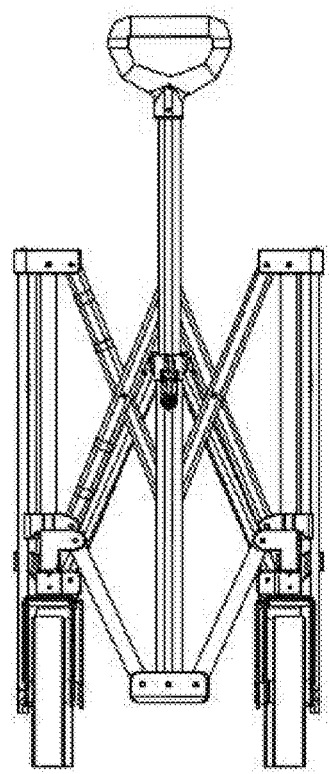
FIG. 9 is a schematic diagram showing the half-folded state of the front of the invention.
Figure 10:
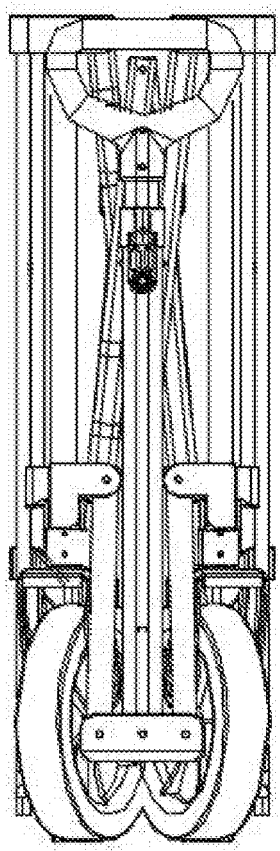
FIG. 10 is a schematic diagram showing the fully-folded state of the front of the invention.

As shown in FIG. 4 which is a schematic diagram showing the front structure of the invention. After lifting up the bottom connecting pieces 13, the standpipes 1 are intend to be close to the center, and the cross pipes 5 are rotated around the rotation points of the top-corner fixed piece 2 and the first linkage sliding sleeve 4. The first linkage sliding sleeve 4 slides downward on the standpipes 1, thereby the front and rear folding components are folded. FIG. 9 shows the half-folded state of the front of the invention and FIG. 10 shows the fully-folded state of the front of the invention, the front height of the invention does not change after folding. With the same principle, the rear height of the invention does not change after folding.

Figure 6:
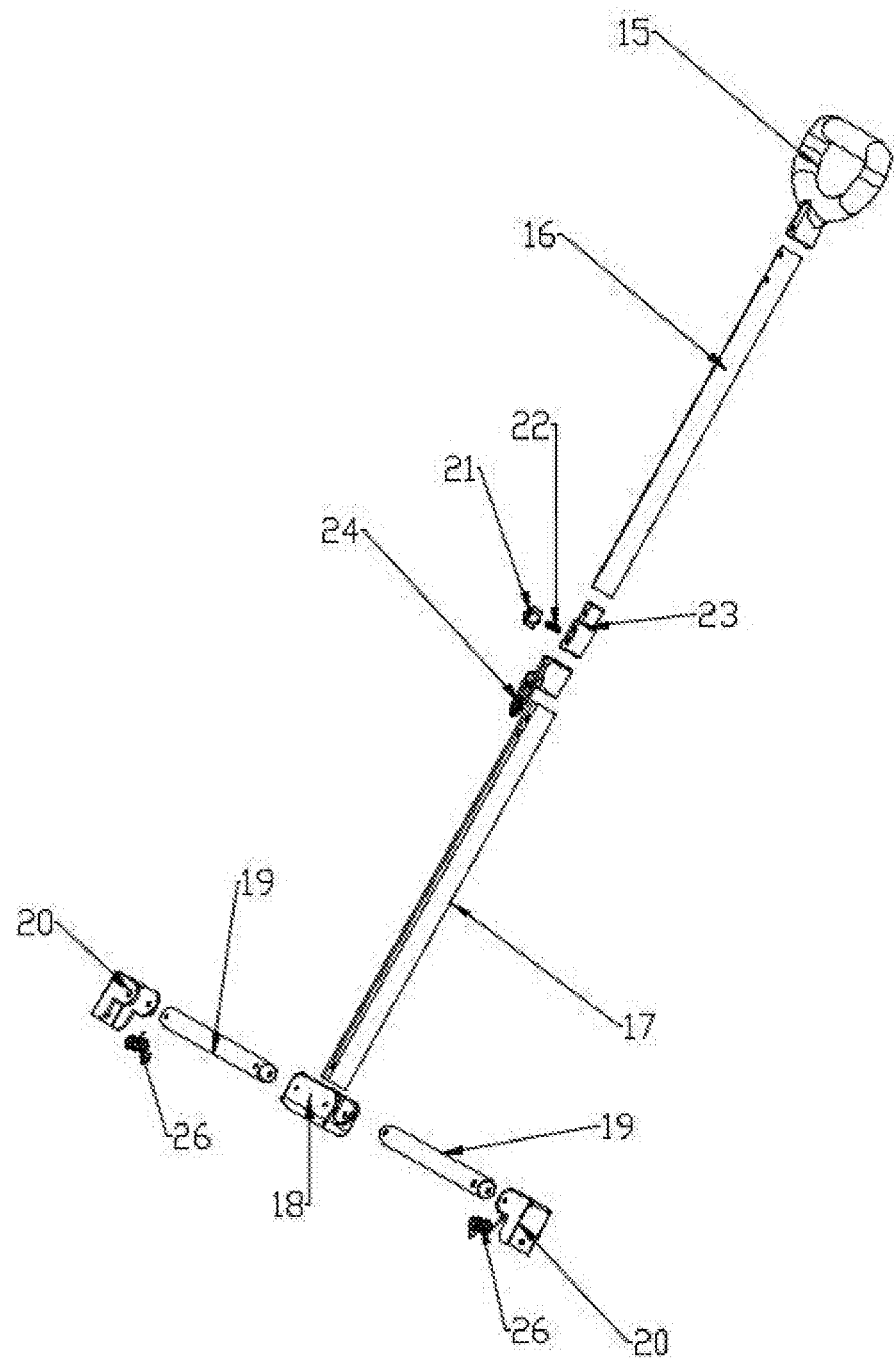
FIG. 6 is an exploded view of the handle components of the invention.

As shown in FIG. 1 and FIG. 6, the handle components of the invention are arranged on the front end of the trailer, wherein the handle components comprise a handle 15, an upper pull rod 16 and a lower pull rod 17, the upper end of the upper pull rod 16 is connected to the handle 15 and the lower end is connected to the lower pull rod 17, the lower end of the lower pull rod 17 is connected to a pull rod connecting piece 18. A pull rod connecting pipe 19 is respectively hinged on both sides of the pull rod connecting piece 18 by articulated shaft, and the other end of the pull rod connecting pipe 19 is hinged to a pull rod steering piece 20 by articulated shaft, the pull rod steering piece 20 is arranged on a fixed U-shape piece 27, the fixed U-shape piece 27 is arranged near the lower end of the fixed standpipes 1.

Figure 11:
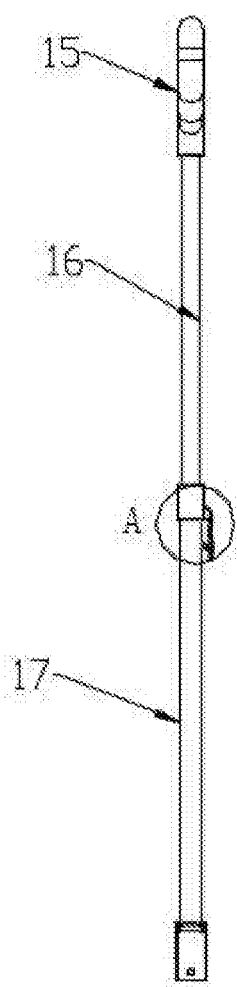
FIG. 11 is a schematic diagram showing the connection of the upper pull rod and the lower pull rod in the invention.
Figure 12:
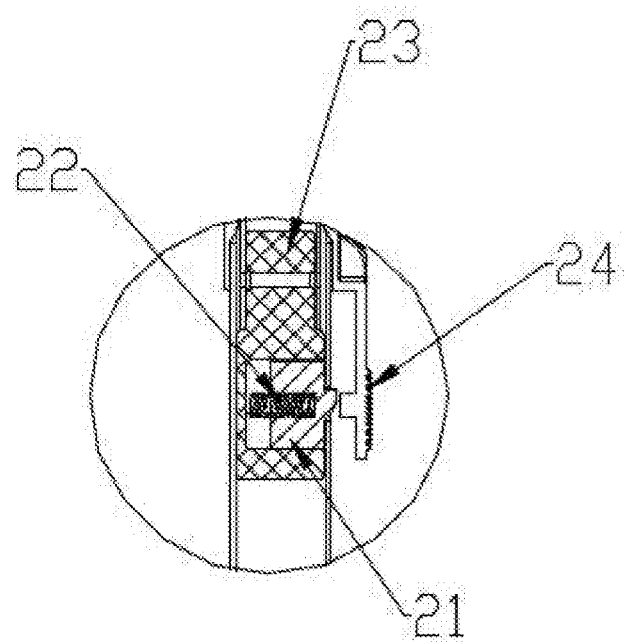
FIG. 12 is a sectional view of Section A in FIG. 11 of the invention.
Figure 13:
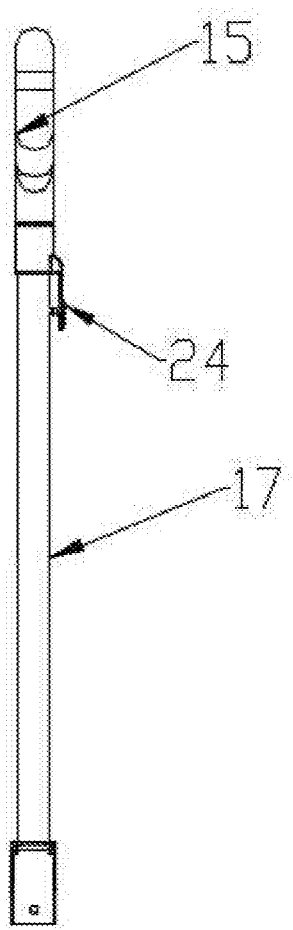
FIG. 13 is a schematic diagram showing telescopic folding of the upper pull rod and the lower pull rod in the invention.

As shown in FIG. 11-13, the handle components comprise telescopic components, the telescopic components comprise a locking clamp 21, a compressed spring 22, an inner pipe fixed piece 23 and an unlock button 24. The unlocking button 24 is fixed on the upper end of the lower pull pod 17, the inner pipe fixed piece 23 is arranged on the lower end of the upper pull rod 16 and can slide up and down in the upper pull rod 17. The locking clamp 21 is arranged in the inner pipe fixed piece 23, and the compressed spring 22 is arranged in the locking clamp 21. The lower pull rod 17 is provided with a locking hole, and a protrusion on the locking clamp 21 is locked on the locking hole of the lower pull rod 17 to realize locking of the upper pull rod 16.

After lifting up the bottom connecting pieces 13, the standpipes 1 are intend to be close to the center, and one end of the pull rod connecting pipe 19 moves downward around the rotation point of the pull rod connecting piece 18, simultaneously, the other end of the pull rod connecting pipe 19 drives the pull rod connecting piece 18 move and fold downward. As the lower pull pod 17 and the pull rod connecting piece 18 are fixed together, the lower pull pod 17 moves and folds downward at the same time.

After folding the front and rear folding components, side folding components, bottom folding components and handle components, the trailer can be telescopically folded. Pressing the unlock button 24, the locking clamp 21 moves inward against the resistance of the compressed spring 22 and disengages from the upper pull rod 17 to realize unlocking, thereby the telescopic folding is realized by pressing downward the upper pull rod 16.

Figure 14:
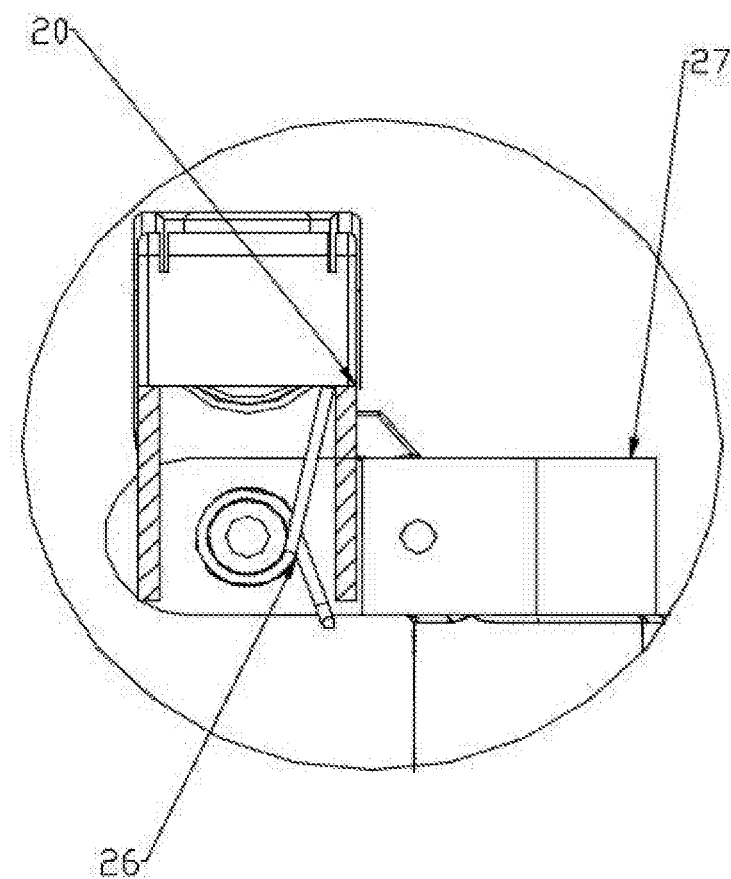
FIG. 14 is a sectional view of Section B in FIG. 2 of the invention.

As shown in FIG. 14, a reset torsion spring 26 is arranged in the pull rod steering piece 20, the handle components of the invention can be automatically reset by being provided the reset torsion spring 26. The reset torsion spring 26 and the pull rod steering piece 20 are connected to the fixed U-shape piece 27 by a rotation point, when the handle components are pulled forward and in use, the reset torsion spring 26 moves around the rotation point on the fixed U-shape piece 27 against the resistance, when the handle components are released, the compressed force of the reset torsion spring 26 bounces the handle components back to vertical state through the pull rod steering piece 20, thereby, the automatically resetting is achieved.

The embodiments described above are merely for explaining the technical schemes and the features of the invention, and intend to enable those skilled in the art to understand the contents of the invention and to implement the invention. The scope of the invention can not be limited by above embodiments, that is, equivalent variations or modifications made by the spirit of the invention, are still within the scope of the invention.

The invention claimed is:

1. A trailer with no extra height when folding, comprising fixed standpipes arranged at a front and rear end of the trailer, and front and rear folding components, side folding components, bottom folding components and handle components connected to the fixed standpipes;

wherein a top-corner fixed piece is fixed on the fixed standpipes, and slidably connected with a first linkage sliding sleeve; the front and rear folding components comprise at least two hinged front and rear X components, the front and rear X components are formed by two cross pipes which are crosswise hinged together by an articulated shaft, the ends of the cross pipes are hinged with the top-corner fixed piece or the first linkage sliding sleeve;

wherein the side folding components comprise two side folding shelves and a folding driving pipe, the side folding shelf comprises a side cross short pipe, a side cross long pipe and a horizontal connecting pipe, the side cross short pipe and the side cross long pipe are crosswise hinged by articulated shaft; one end of the folding driving pipes is hinged with two said horizontal connecting pipes, and the other end thereof is hinged with ends of two said side cross long pipes; the other end of the side cross long pipe is hinged with the top-corner fixed piece, one end of the side cross short pipe is hinged with the first linkage sliding sleeve and the other end thereof is hinged with one end of the horizontal connecting pipe; the bottom folding components comprise two bottom X components, the bottom X components are formed by one end of four bottom connecting pipes being simultaneously hinged with one same bottom connecting piece; the other end of the bottom connecting pipe is hinged with a second linkage sliding sleeve slidably connected with the folding driving pipe or a bottom-corner fixed piece fixedly connected to the fixed standpipes.

2. The trailer with no extra height when folding of claim 1, wherein two fixed standpipes are respectively arranged at front and rear ends of the trailer, the top-corner fixed piece is arranged at an upper end of any of the fixed standpipes, and a bottom-corner fixed piece is arranged near a lower end of any of the fixed standpipes; the first linkage sliding sleeve is arranged between the top-corner fixed piece and the bottom-corner fixed piece.

3. The trailer with no extra height when folding of claim 2, wherein two fixed standpipes arranged at front end of the trailer and two fixed standpipes arranged at rear end of the trailer are respectively arranged with front and rear folding components; two fixed standpipes arranged at left side of the trailer and two fixed standpipes arranged at right side of the trailer are respectively arranged with side folding components, and the bottom folding components are arranged near the lower end of the fixed standpipes.

4. The trailer with no extra height when folding of claim 1, wherein one end of the horizontal connecting pipe is provided with a joint I, one end of the side cross long pipe is provided with a joint II, one end of the folding driving pipe is hinged to two said joint I by articulated shaft, and the other end thereof is hinged to two said joint II by articulated shaft.

5. The trailer with no extra height when folding of claim 1, wherein one end of the cross pipes of two adjacent said front and rear folding components are hinged by articulated shaft.

6. The trailer with no extra height when folding of claim 1, wherein any of the fixed standpipes is provided with an idler wheel on the lower end, the idler wheel is arranged on the lower end of the fixed standpipes by a wheel fork.

7. The trailer with no extra height when folding of claim 1, wherein the handle components comprise a handle, an upper pull rod and a lower pull rod, the upper end of the upper pull rod is connected to the handle and the lower end is connected to the lower pull rod, the lower end of the lower pull rod is connected to a pull rod connecting piece; a pull rod connecting pipe is respectively hinged on both sides of the pull rod connecting piece by articulated shaft, and the other end of the pull rod connecting pipe is hinged to a pull rod steering piece by articulated shaft, the pull rod steering piece is arranged on a fixed U-shape piece, the fixed U-shape piece is arranged near the lower end of the fixed standpipes.

8. The trailer with no extra height when folding of claim 7, wherein the handle components comprise telescopic components, the telescopic components comprise a locking clamp, a compressed spring, an inner pipe fixed piece and an unlock button; the unlocking button is fixed on the upper end of the lower pull pod, the inner pipe fixed piece is arranged on the lower end of the upper pull rod and can slide up and down in the lower pull pod; the locking clamp is arranged in the inner pipe fixed piece, and the compressed spring is arranged in the locking clamp; the lower pull rod is provided with a locking hole, and a protrusion on the locking clamp is locked on the locking hole of the lower pull rod to realize locking of the upper pull rod.

9. The trailer with no extra height when folding of claim 7, wherein a reset torsion spring is arranged in the pull rod steering piece, the reset torsion spring and the pull rod steering piece are connected to the fixed U-shape piece by a rotation point.

10. The trailer with no extra height when folding of any one of claim 1, wherein the side height and the front and rear height of the trailer are unchanged after folding.

\* \* \* \* \*